(12) United States Patent
Shim et al.

(10) Patent No.: US 10,708,400 B2
(45) Date of Patent: Jul. 7, 2020

(54) MOBILE TERMINAL

(71) Applicant: LG ELECTRONICS INC., Seoul (KR)

(72) Inventors: Hongjo Shim, Seoul (KR); Hyunwoo Kim, Seoul (KR); Cheongsun Yun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/385,601

(22) Filed: Apr. 16, 2019

(65) Prior Publication Data
US 2020/0169625 A1   May 28, 2020

(30) Foreign Application Priority Data
Nov. 23, 2018 (WO) ............... PCT/KR2018/014494

(51) Int. Cl.
| H01L 27/20 | (2006.01) |
| H01L 27/12 | (2006.01) |
| G01S 7/52 | (2006.01) |
| G06K 9/00 | (2006.01) |
| H04M 1/02 | (2006.01) |
| H04M 1/725 | (2006.01) |

(52) U.S. Cl.
CPC ..... *H04M 1/0277* (2013.01); *H04M 1/72522* (2013.01); *H04M 1/72569* (2013.01); *H04M 2250/12* (2013.01); *H04M 2250/22* (2013.01)

(58) Field of Classification Search
CPC ........... H04M 1/0277; H04M 1/72522; H04M 1/72569; H04M 2250/12; H04M 2250/22; H01L 27/20; H01L 27/12; H01L 41/113; H01L 41/311; G06F 3/043; G01S 7/52; G06K 9/00

See application file for complete search history.

(56) References Cited

U.S. PATENT DOCUMENTS

| 9,024,870 | B2 | 5/2015 | Kim et al. | |
| 9,262,003 | B2* | 2/2016 | Kitchens | G06F 3/0436 |
| 9,945,818 | B2 | 4/2018 | Ganti et al. | |
| 10,067,229 | B2* | 9/2018 | Djordjev | G01S 15/89 |
| 10,478,858 | B2* | 11/2019 | Lasiter | G06F 3/0412 |
| 2017/0110504 | A1* | 4/2017 | Panchawagh | H01L 27/20 |
| 2018/0267666 | A1* | 9/2018 | Park | G06F 3/0412 |
| 2018/0369866 | A1* | 12/2018 | Sammoura | B06B 1/0622 |
| 2019/0004662 | A1* | 1/2019 | Gagne-Keats | G06F 3/0414 |
| 2019/0205603 | A1* | 7/2019 | Lee | H01L 27/3225 |

FOREIGN PATENT DOCUMENTS

| EP | 2541386 A1 | 1/2013 |
| KR | 10-2014-0034625 A | 3/2014 |
| KR | 10-2016-0057534 A | 5/2016 |

* cited by examiner

*Primary Examiner* — Pablo N Tran
(74) *Attorney, Agent, or Firm* — Birch, Stewart, Kolasch & Birch, LLP

(57) ABSTRACT

A mobile terminal including a terminal body; an ultrasonic sensing unit mounted on at least one side surface of the terminal body and configured to generate an ultrasonic wave on a path propagating along the at least one side surface of the terminal body; and a detecting circuit configured to detect a touch applied to the terminal body by using a signal change caused due to a touch on the path of the ultrasonic wave.

18 Claims, 15 Drawing Sheets

MOBILE TERMINAL

CROSS-REFERENCE TO RELATED APPLICATION

Pursuant to 35 U.S.C. § 119(a), this application claims the benefit of an earlier filing date of and the right of priority to PCT International Application No. PCT/KR2018/014494 filed on Nov. 23, 2018, the contents of which are incorporated by reference herein in its entirety.

BACKGROUND OF THE DISCLOSURE

1. Field of the Disclosure

The present invention relates to a sensor and a mobile terminal having the same.

2. Description of the Related Art

Terminals can be divided into mobile/portable terminals and stationary terminals according to mobility. Also, the mobile terminals can be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

In addition to those attempts, the mobile terminals provide various services in recent years by virtue of commercialization of sensing technologies for sensing various types of user inputs. As an example, a technique of detecting a sliding-type input on a portion where a touch sensor is difficult to be mounted can be developed. For example, there has been a limitation in applying a touch sensor to a metal case. In this regard, a technique for detecting a force applied to a terminal using a force sensor has been developed. However, it is also difficult to accurately detect a coordinate value in a wide region.

SUMMARY OF THE DISCLOSURE

The present invention is directed to solving the aforementioned problems and other drawbacks.

In one aspect, the present invention provides a novel sensing mechanism using an ultrasonic sensor, as a technology to be applicable to a portion, such as a metal case or the like where a touch sensor is difficult to be applied and also a force sensor is difficult to be applied due to a wide sensing region.

Another aspect of the present invention is to secure performance capable of sensing a touch-type input applied to a metal rim in a mobile terminal having the metal rim.

Still another aspect of the present invention is to provide a mobile terminal in which a superior ultrasonic sensor is realized, which may result in providing a buttonless type mobile terminal.

According to one aspect of the present invention to achieve the aforementioned aspects and other advantages, a user input applied to a mobile terminal can be sensed by using a signal change of an ultrasonic receiving sensor caused due to a touch on an ultrasonic path. That is, according to an embodiment of the present invention, an ultrasonic sensor is disposed inside a side surface of a metal case to form a sensing region in the metal case, thereby realizing a mobile terminal which is made of a metallic material but has not physical button on its side surfaces.

As a more specific example, the mobile terminal may include a terminal body having front, rear and side surfaces, an ultrasonic sensing unit mounted on the terminal body and including an ultrasonic output sensor, and an ultrasonic receiving sensor spaced apart from the ultrasonic output sensor to receive an ultrasonic wave output from the ultrasonic output sensor, and a detecting unit to detect a touch applied to the terminal body by using a signal change of the ultrasonic receiving sensor caused due to a touch on a path of the ultrasonic wave.

According to at least one of embodiments of the present invention, a sliding input applied to a case made of a metallic material can be detected by using an ultrasonic sensing unit.

In addition, continuity of a physical medium can be interrupted by forming an empty space between a mounting portion of an ultrasonic output sensor and a mounting portion of an ultrasonic receiving sensor. This may prevent noise from being introduced into other adjacent sensing parts, thereby improving performance of an ultrasonic sensing unit. Further, a barrier rib formed in a case can be disposed in the empty space, thereby blocking noise more firmly.

Also, the present invention can detect a touch input applied to a metal case, thereby minimizing deterioration of appearance of a case due to a button.

In addition, the present invention can improve sensing sensitivity of an ultrasonic sensor even when a mobile terminal is covered with a cover, by way of combining an ultrasonic sensing unit and a force sensor.

In addition, the present invention can implement a new type of mechanism enabling various inputs even without a physical button, by arranging in a line a first sensing region for sensing a sliding input, and a second sensing region for sensing a force input.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1A:
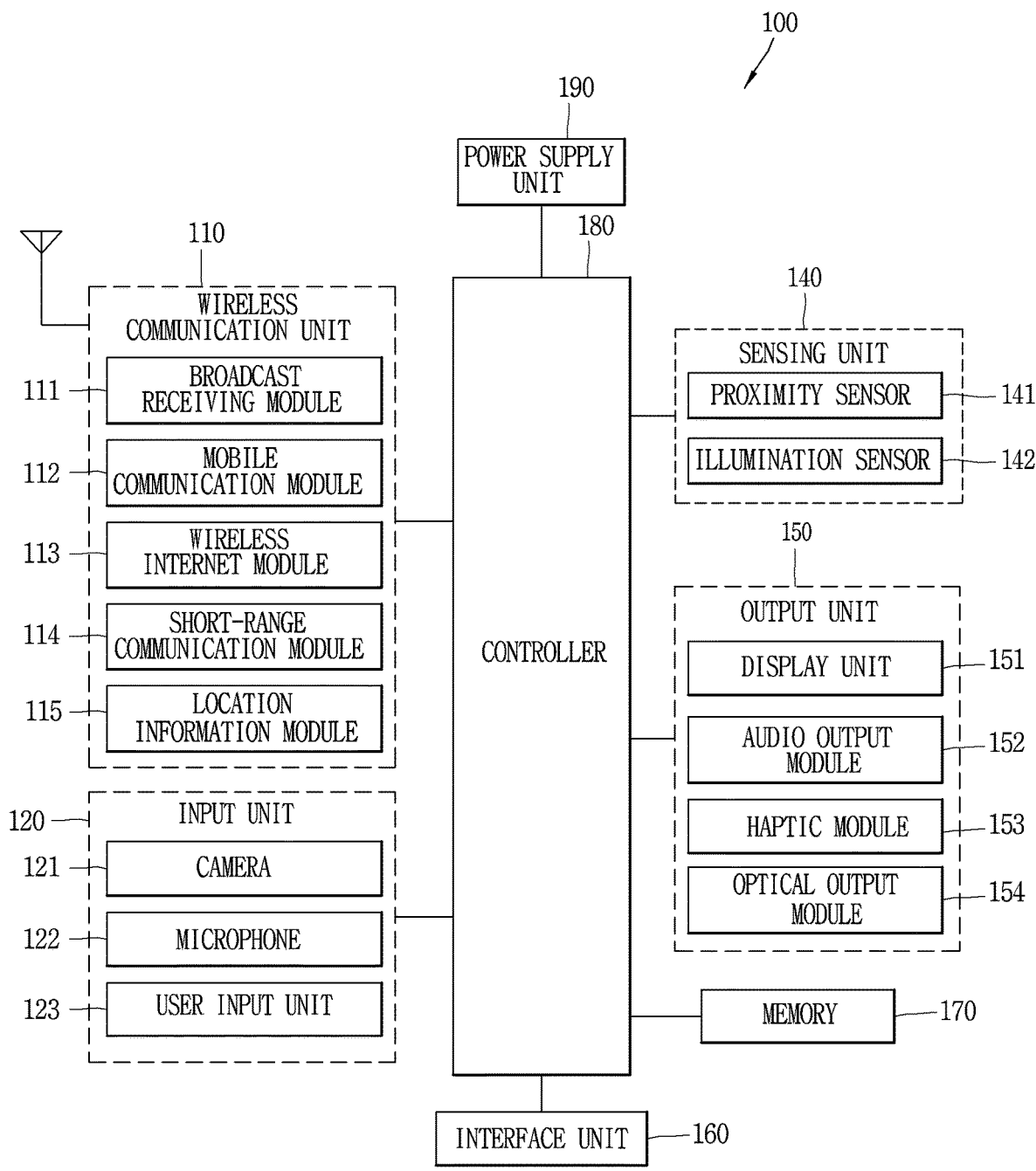
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Although the terms first, second, etc. can be used herein to describe various elements, these elements should not be limited by these terms. These terms are generally only used to distinguish one element from another.

When an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
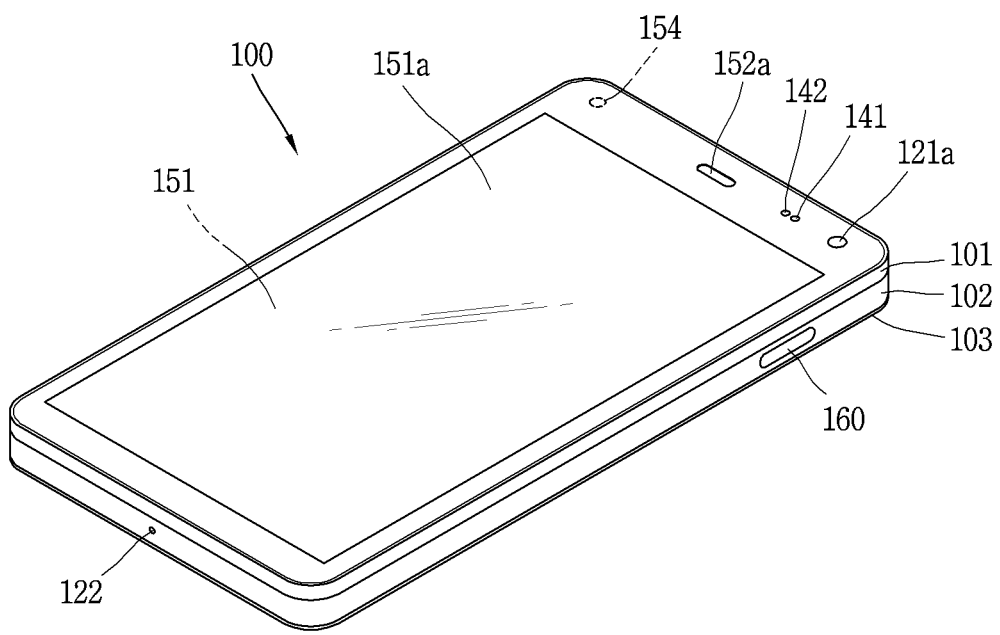
FIGS. 1B and 1C are conceptual views illustrating one example of a typical mobile terminal according to an embodiment of the present invention, viewed from different directions.
Figure 1C:
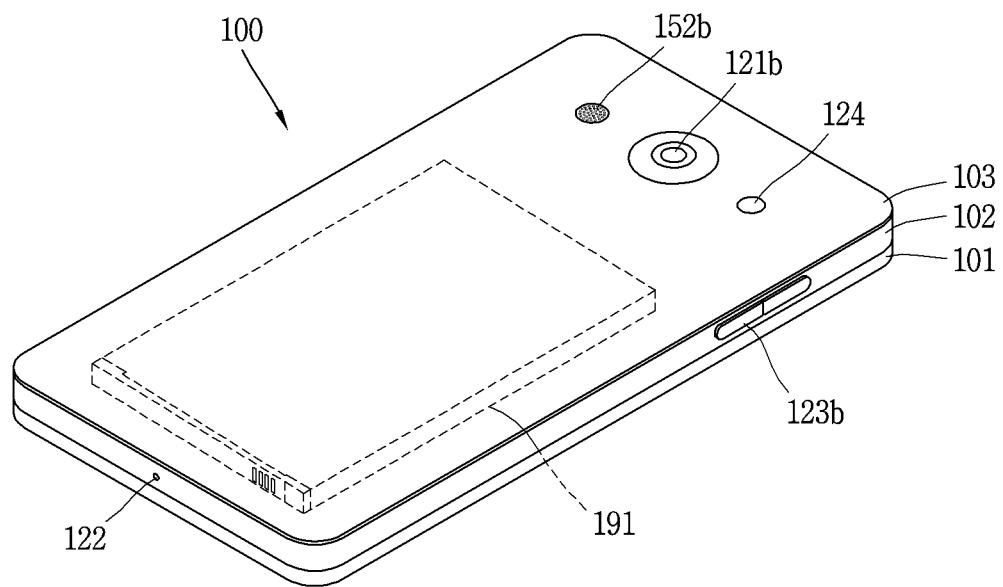

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115. The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) can be obtained by the input unit 120 and can be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein can be configured to utilize information obtained from one or more sensors of the sensing unit 140, and combinations thereof.

The output unit 150 may typically be configured to output various types of information, such as audio, video, tactile output, and the like. The output unit 150 can be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 can be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is typically the case for basic functions of the mobile terminal 100 (for example, receiving a call, placing a call, receiving a message, sending a message, and the like). Application programs can be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 can control at least some of the components illustrated in FIG. 1A, to execute an application program that have been stored in the memory 170. In addition, the controller 180 can control at least two of those components included in the mobile terminal 100 to activate the application program.

The power supply unit 190 can be configured to receive external power or provide internal power in order to supply appropriate power required for operating elements and components included in the mobile terminal 100. The power supply unit 190 may include a battery, and the battery can be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal can be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules can be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception. The wireless Internet module 113 refers to a module for wireless Internet access. This module can be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element can be a virtual key, a soft key or a visual key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 can be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 can be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor can be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals can be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input can be decided based on a current operating state of the mobile terminal 100 or a currently executed application program, for example.

The touch sensor and the proximity sensor can be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor can be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 can be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 can be implemented so the mobile terminal emits monochromatic light or light with a plurality of colors. The signal output can be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port can be configured as one example of the interface unit 160 to which an external charger for supplying power to recharge the battery is electrically connected. As another example, the power supply unit 190 can be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case can be additionally positioned between the front case 101 and the rear case 102.

The display unit 151 is shown located on the front side of the terminal body to output information. As illustrated, a window 151a of the display unit 151 can be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this instance, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some instances, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or can be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this instance, a mobile terminal 100 having a uni-body is formed so synthetic resin or metal extends from a side surface to a rear surface.

In addition, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components can be omitted or rearranged or located on different surfaces. For example, the first manipulation unit 123a can be located on another surface of the terminal body, and the second audio output module 152b can be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display. The display unit 151 can be implemented using two display devices, according to the configuration type thereof. For instance, a plurality of the display units 151 can be arranged on one side, either spaced apart from each other, or these devices can be integrated, or these devices can be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner can be characters, numbers, instructions in various modes, or a menu item that can be specified.

Further, the touch sensor can be configured in a form of a film having a touch pattern and disposed between a window 151a and a display (not illustrated) on a rear surface of the window, or can be a metal wire directly patterned on the rear surface of the window. Alternatively, the touch sensor can be formed integrally with the display. For example, the touch sensor can be disposed on a substrate of the display, or can be provided inside the display.

In this way, the display unit 151 may form a touch screen together with the touch sensor, and in this instance, the touch screen may function as the user input unit (123, see FIG. 1A). In some cases, the touch screen may replace at least some of functions of a first manipulation unit 123a.

The first audio output module 152a can be implemented as a receiver for transmitting a call sound to a user's ear and the second audio output module 152b can be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds can be released along an assembly gap between the structural bodies (for example, a gap between the window 151a and the front case 101). In this instance, a hole independently formed to output audio sounds may not be seen or may otherwise be hidden in terms of appearance, thereby further simplifying the appearance of the mobile terminal 100.

The optical output module 154 can be configured to output light for indicating an event generation. Examples of such events may include a message reception, a call signal reception, a missed call, an alarm, a schedule alarm, an email reception, information reception through an application, and the like. When a user has checked a generated event, the controller 180 can control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which can be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure is not limited to this. For example, the first manipulation unit 123a can be configured with a mechanical key, or a combination of a touch key and a push key.

The content received by the first and second manipulation units 123a and 123b can be set in various ways. For example, the first manipulation unit 123a can be used by the user to input a command such as menu, home key, cancel, search, or the like, and the second manipulation unit 123b can be used by the user to input a command, such as controlling a volume level being output from the first or second audio output module 152a or 152b, switching into a touch recognition mode of the display unit 151, or the like.

Further, as another example of the user input unit 123, a rear input unit can be disposed on the rear surface of the terminal body. The rear input unit can be manipulated by a user to input a command for controlling an operation of the mobile terminal 100. The content input can be set in various ways. For example, the rear input unit can be used by the user to input a command, such as power on/off, start, end, scroll or the like, controlling a volume level being output from the first or second audio output module 152a or 152b, switching into a touch recognition mode of the display unit 151, or the like. The rear input unit can be implemented into a form allowing a touch input, a push input or a combination thereof.

The rear input unit may be disposed to overlap the display unit 151 of the front surface in a thickness direction of the terminal body. As one example, the rear input unit can be disposed on an upper end portion of the rear surface of the terminal body such that a user can easily manipulate it using a forefinger when the user grabs the terminal body with one hand. However, the present disclosure is not limited to this, and the position of the rear input unit can be changeable.

When the rear input unit is disposed on the rear surface of the terminal body, a novel user interface can be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 can be implemented to have a larger screen.

Further, the mobile terminal 100 may include a finger scan sensor which scans a user's fingerprint. The controller can use fingerprint information sensed by the finger scan sensor as an authentication means. The finger scan sensor can be installed in the display unit 151 or the user input unit 123.

The microphone 122 can be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 can be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 can be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

In addition, the second camera 121b may include a plurality of lenses arranged along at least one line. The plurality of lenses can be arranged in a matrix form and referred to as an 'array camera.' When the second camera 121b is implemented as the array camera, images can be captured in various manners using the plurality of lenses and images with better qualities can be obtained.

The flash 124 can be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and can be also used for implementing a speaker phone mode for call communication.

At least one antenna for wireless communication can be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 can be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 can be provided. The cover or pouch may cooperate with the display unit 151 to extend the function of the mobile terminal 100. Another example of the accessory can be a touch pen for assisting or extending a touch input onto a touch screen.

Further, a mechanism for detecting a user input using a new type of sensing technology can be applied to the mobile terminal. Hereinafter, the mechanism will be described in more detail. Particularly, in the present invention, the mobile terminal uses an ultrasonic sensing unit to detect touch-type inputs applied to a case, a side decorative member, a window, a battery cover and the like. Examples of the touch-type inputs include a short touch (or a tap touch), a long touch, a multi-touch, a drag touch, a flick touch, a pinch-in touch, a pinch-out touch, a swipe touch, a hovering touch, and the like. In addition, in the present invention, the ultrasonic sensing unit is configured to sense a sliding touch. A sliding touch means an input that a person's finger or another object such as a stylus pen is slid from one point to another point spaced apart from the one point.

Hereinafter, a mobile terminal 100 having an ultrasonic sensing unit according to one embodiment of the present invention will be described with reference to the accompanying drawings. In particular, FIG. 2 is a conceptual view illustrating an example of configuring an ultrasonic sensing unit in a mobile terminal according to an embodiment of the present invention.

Figure 2:
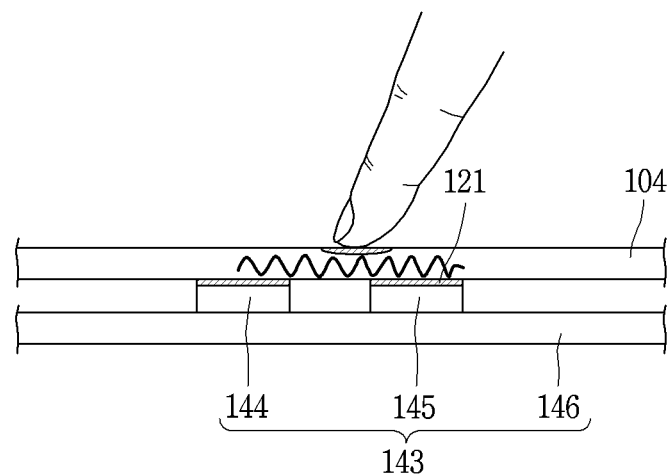
FIG. 2 is a conceptual view illustrating an example of configuring an ultrasonic sensing unit in a mobile terminal according to an embodiment of the present invention.

As illustrated in FIG. 2, in one embodiment of the present invention, an ultrasonic sensing unit 143 is disposed inside a case 104 forming at least part of appearance of a mobile terminal. The case 104 includes a frame, a housing, a cover, a window, a rear cover, a decorative member, a flexible display, and the like which are provided in the mobile terminal.

Various electronic components are disposed in an inner space formed by coupling various types of cases, and the case 104 and the various electronic components are combined to form a main body (or terminal body) of the mobile terminal. As an alternative to the example in which the plurality of cases form an inner space for accommodating components, the mobile terminal 100 can be configured such that one case forms the inner space. The case 104 may be formed by injection-molding synthetic resin or may be formed of a metal, for example, stainless steel (STS), aluminum (Al), titanium (Ti), or the like.

The ultrasonic sensing unit 143 can be mounted to the main body of the mobile terminal to face an inner surface of the case 104. More specifically, the ultrasonic sensing unit 143 may include an ultrasonic output sensor 144, an ultrasonic receiving sensor 145, and a circuit board 146.

The ultrasonic output sensor 144 is mounted to one point of the circuit board 146 to output ultrasound waves. An ultrasonic wave is a sound wave that cannot be heard by human ears because its frequency is very large, more than 16,000 hertz in one second. The ultrasonic wave has a strong tendency to go straight like light because of its high frequencies and a short wavelength. More specifically, the ultrasonic output sensor 144 can be a piezoelectric sensor, and generate an ultrasonic acoustic wave from an electric signal as a result of a piezoelectric effect.

The ultrasonic receiving sensor 145 is spaced apart from the ultrasonic output sensor 144 and receives ultrasonic waves output from the ultrasonic output sensor 144. The ultrasonic receiving sensor 145 can be disposed on the circuit board 146 at a preset distance from the ultrasonic output sensor 144.

The circuit board 146 can be disposed to face an inside of the case 104. More specifically, a surface of the circuit board 146 on which the ultrasonic output sensor 144 and the ultrasonic receiving sensor 145 are mounted is disposed to face an inner surface of the case 104.

Further, the ultrasonic output sensor 144 and the ultrasonic receiving sensor 145 can be located to be in contact with the inner surface of the case 104. For the contact, an upper surface of the ultrasonic output sensor 144 and an upper surface of the ultrasonic receiving sensor 145 can be adhered to the inner surface of the case by an adhesive member 121.

According to the structure, an ultrasonic wave output from the ultrasonic output sensor 144 can be a surface acoustic wave. In more detail, the surface acoustic wave is an acoustic wave propagating along a surface of an elastic substrate. An acoustic wave is generated from an electric signal as a result of a piezoelectric effect. Further, an electric field of the acoustic wave is concentrated near the surface of the substrate.

The surface acoustic waves can propagate along the case 104 as the ultrasonic output sensor 144 capable of vibrating the ultrasonic waves is disposed on the inner surface of the case 104. When a finger or another object touches a surface of the case 104, ultrasonic waves are absorbed or reduced, and a touch position can be detected by a signal change of the ultrasonic receiving sensor 145.

The mobile terminal can include a detecting unit for detecting a touch applied to the main body by using a signal change of the ultrasonic receiving sensor 145 caused due to the touch applied on a path of the ultrasonic waves. The detecting unit can be a driver provided on the circuit board 146, another circuit board (for example, a main circuit board) electrically connected to the circuit board 146, or a separate driving chip provided on the another circuit board.

In this embodiment, in particular, the ultrasonic output sensor 144 and the ultrasonic receiving sensor 145 can be arranged in one direction so that the ultrasonic sensing unit 143 can sense a sliding touch. Accordingly, the ultrasonic sensing unit 143 detects that a finger or another object is slid on the surface of the case 104, and the detecting unit processes the sliding as a preset control command.

The preset control command can be, for example, an adjustment of screen brightness, intensity of vibration or volume of sound in a setting mode, a volume adjustment or switching of a playback file in a music or video playback mode, or a scroll operation in an Internet mode. More specifically, when sliding-up is detected, brightness, intensity and volume can be increased or a screen can be scrolled upward. Further, when sliding-down is detected, brightness, intensity and volume can be reduced or a screen can be scrolled downward.

Also, in this embodiment, the ultrasonic sensing unit 143 can sense a strength of touch force, as like a force sensor does, using an absorption of ultrasonic waves. For example, when the case 104 is pressed with a weak force, a touch area is narrow and thus an absorption of ultrasonic waves is reduced. Further, when the case 104 is pressed with a strong force, a touch area is wide and thus an absorption of ultrasonic waves also increases. In this indirect manner, the ultrasonic sensing unit 143 can sense strength of force of a touch input. In this instance, a control command defined in a touch input can be a squeeze input.

For example, the ultrasonic sensing unit 143 can be disposed on each of both sides of the main body so as to be distinguished into a grip state and a squeeze state according to strength of applied pressure. For example, when a pressure lower than a preset value is applied to a touch input, the ultrasonic sensing unit 143 can identify it as a grip state. On the other hand, when a pressure equal to or greater than the preset value is applied to a touch input, the ultrasonic sensing unit 143 can identify it as a squeeze state and perform a control operation according to this.

The foregoing description has been given of a structure for sensing a sliding input or force input using the ultrasonic sensing unit 143. Hereinafter, various embodiments in which the ultrasonic sensing unit 143 is applied to a mobile terminal will be described in detail with reference to the drawings.

Figure 3:
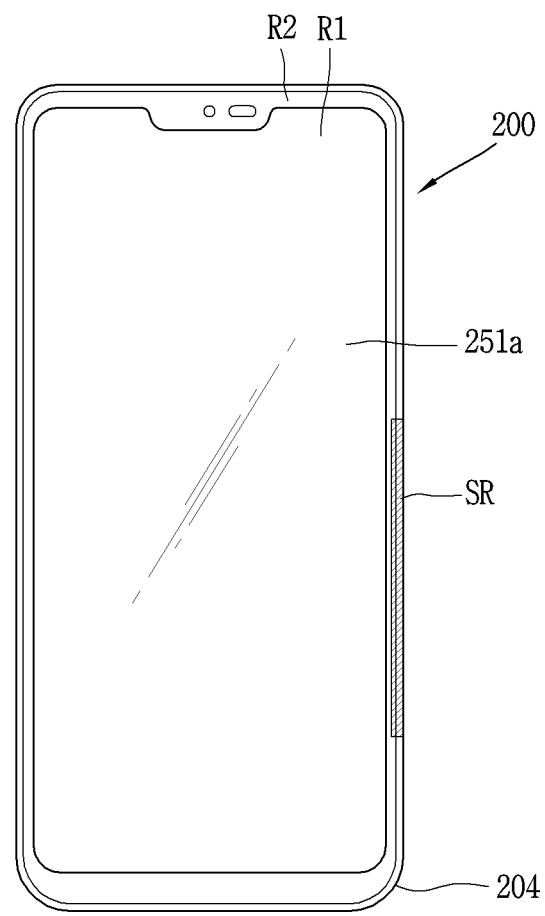
FIG. 3 is a front view of a mobile terminal in accordance with the present invention.
Figure 4:
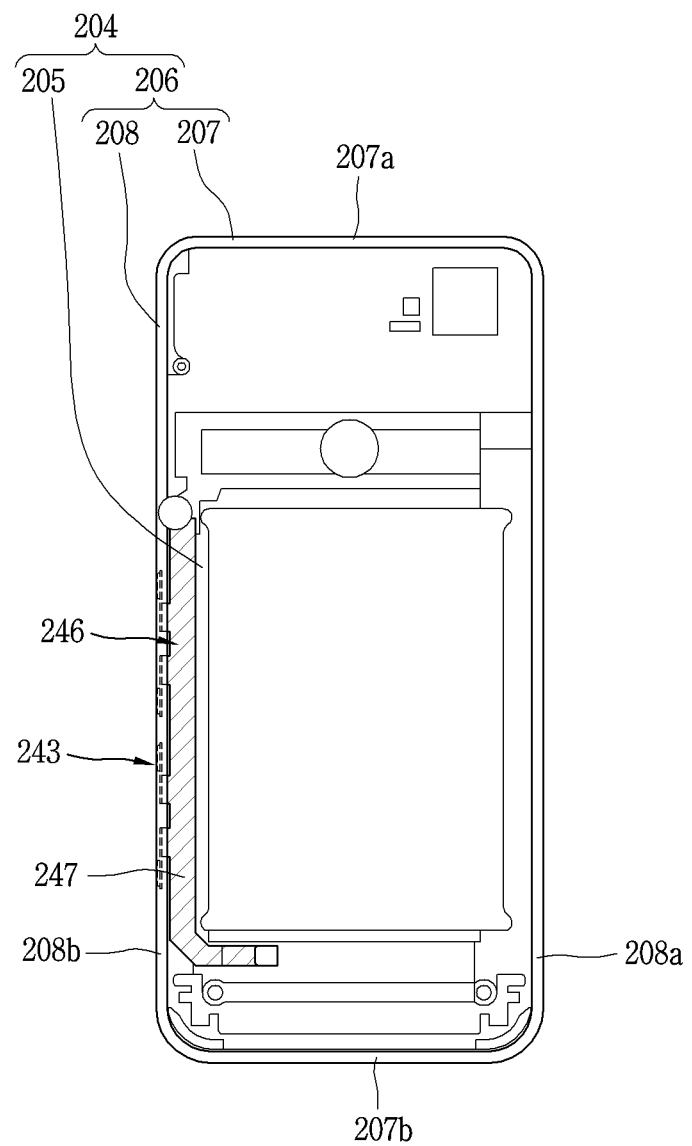
FIG. 4 is an exploded view of the mobile terminal of FIG. 3.
Figure 5:
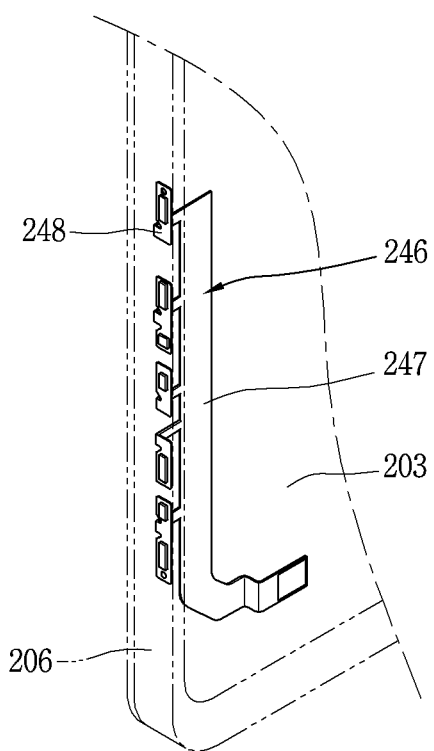
FIG. 5 is an enlarged view of a part A in FIG. 4.
Figure 6:
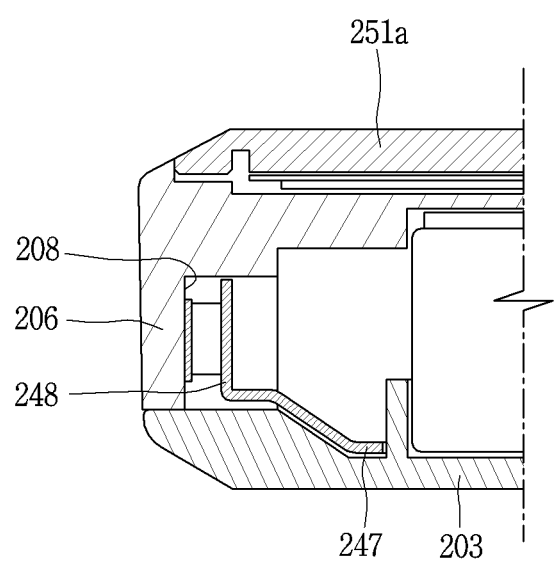
FIG. 6 is a sectional view taken along the line B-B of FIG. 3.
Figure 7A:
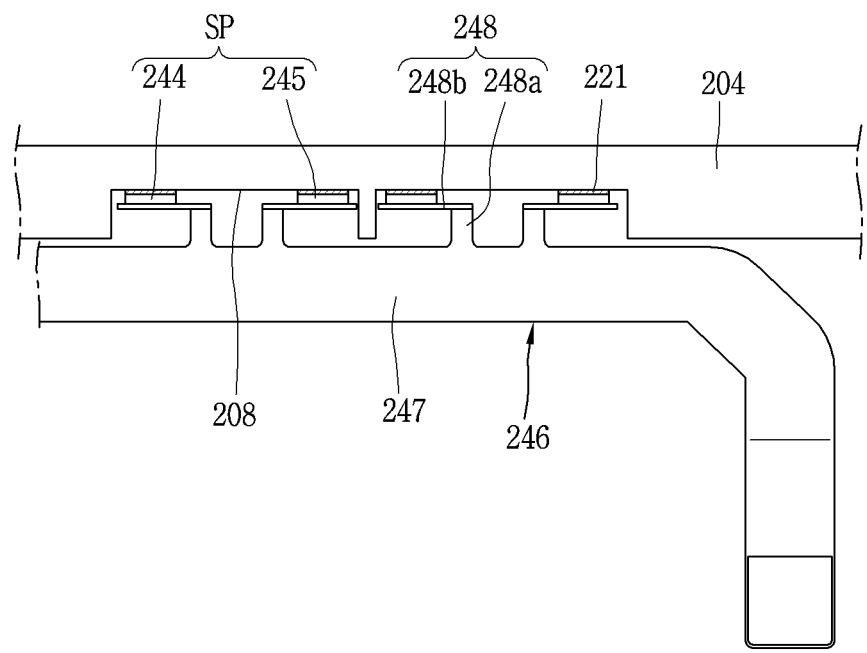
FIGS. 7A and 7B are enlarged views of an ultrasonic sensing unit of FIG. 5.
Figure 7B:
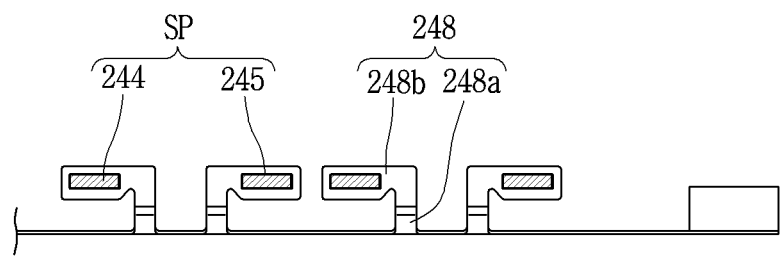

In particular, FIG. 3 is a front view of a mobile terminal in accordance with the present invention, FIG. 4 is an exploded view of the mobile terminal of FIG. 3, FIG. 5 is an enlarged view of a part A in FIG. 4, FIG. 6 is a sectional view taken along the line B-B of FIG. 3, and FIGS. 7A and 7B are enlarged views of an ultrasonic sensing unit of FIG. 5.

As illustrated in FIGS. 3 and 4, one embodiment of the present invention illustrates that an ultrasonic sensing unit 243 is provided on one side surface of a terminal body (or a main body of a mobile terminal). However, the present invention is not limited thereto, and the ultrasonic sensing unit 243 may alternatively be disposed on both side surfaces of the terminal as illustrated in another embodiment. As another example, the ultrasonic sensing unit 243 may be disposed on a front surface or a rear surface of a terminal.

A mobile terminal 200 according to one embodiment of the present invention includes a case 204 that forms appearance of a terminal body. Further, according to embodiments, the mobile terminal 200 may further include a cover glass 251a. When the cover glass 251a is included, the case 204 is disposed below the cover glass 251a. The cover glass 251a can be the window 151a of the display unit 151 and may form a front surface of a terminal body. The cover glass 251a can be formed of tempered glass. However, the present invention is not limited thereto, and any other material such as a synthetic resin can be used as long as it is transparent to transmit visual information therethrough while covering a display.

A rear cover 203 can be mounted on a rear surface of the case 204. The cover glass 251a and the rear cover 203 are accommodated in a front side and a rear side of the case 204, respectively, and the cover glass 251a, the rear cover 203, and the case 204 form an inner space. A plurality of components such as a display module can be disposed at the front side of the case 204 in the inner space. The display unit 151 described above includes the cover glass 251a and a display module.

The cover glass 251a, as illustrated in FIG. 3, includes a transparent region R1 for displaying visual information toward outside and an opaque region R2 for surrounding the transparent region R1, and the opaque region R2 forms a bezel area. For example, a printing layer can be disposed on a lower surface of the opaque region R2, and visual information by the display module may not be displayed at the outside by the printing layer.

Other electronic components can be mounted at the rear side of the case 204. Examples of such electronic components include a detachable battery, an identification module, a memory card, and the like. In this instance, the rear cover 203 can be coupled to a rear surface of the case 204 to cover the mounted electronic components.

The rear cover 203 is disposed to cover the rear surface of the terminal 200, except for a region where components such as a rear input unit, a flash, a camera, a sound output module and the like are exposed. The rear input unit is a finger scan sensor, and can be configured to scan a user's fingerprint and perform user authentication.

The case 204 includes the integrally-formed front case 101 and rear case 102 described above with reference to FIGS. 1B and 1C. The case 204 can be formed of a metallic material, and can be referred to as a metal case.

As illustrated, when the cover glass 251a and the rear cover 203 are disposed on the front surface and the rear surface of the case 204, a part of a side surface of the case 204 can be exposed to the outside. As described above, the case 204 is made of a metallic material and thus has sufficient rigidity even if it is formed to have a slim thickness. Therefore, the case 204 can be a frame.

In addition, the case 204 may have a metal rim 206 forming side surfaces of the mobile terminal so as to connect a front surface and a rear surface of the mobile terminal. The metal rim 206 can be made of a metallic material. More specifically, the case 204 has a frame portion 205 facing the cover glass 251a, and the metal rim 206 can be formed along edges of the frame portion 205.

The frame portion 205 may be a part parallel to the front and rear surfaces of the mobile terminal and may have a front side facing the front surface and a rear side facing the rear surface. The metal rim 206 may be disposed in a direction perpendicular to the frame portion 205 to support the cover glass 251a at the front side and the rear cover 203 at the rear side. Here, supporting may refer to not only contacting but also even engaging with each other.

More specifically, a display module can be accommodated in a front side of the frame portion 205, and the metal rim 206 can extend along edges of the frame portion 205 to form a metal frame of the mobile terminal. The metal rim 206 includes a first metal rim 207 disposed at an upper or lower end of the mobile terminal, and a second metal rim 208 disposed at the side surfaces of the mobile terminal. Further, the first metal rim 207 includes an upper end portion 207a located at the upper end of the mobile terminal, and a lower end portion 207b located at the lower end of the mobile terminal, and the second metal rim 208 may include side end portions 208a and 208b located at both side surfaces of the mobile terminal.

The upper end portion 207a and the lower end portion 207b extend in one direction between the side surfaces of the mobile terminal to form upper or lower appearance of the mobile terminal. The side end portions 208a and 208b are disposed in a pair between the upper end portion and the lower end portion to form appearance of the side surfaces of the mobile terminal. This embodiment illustrates that the upper end portion 207a and the lower end portion 207b of the metal rim are shorter than the side end portions 208a and 208b.

Referring to the accompanying drawings, the ultrasonic sensing unit 243 can be disposed adjacent to one of the side end portions 208a and 208b of the mobile terminal. For example, the ultrasonic sensing unit 243 can include a flexible circuit board 246 on which an ultrasonic output sensor 244 and an ultrasonic receiving sensor 245 are mounted, and the flexible circuit board 246 can be mounted on the frame portion 205.

The flexible circuit board 246 may include a base portion 247 disposed on a plane of the frame portion 205. In this instance, the plane of the frame portion 205 can be a rear face of the frame portion 205. The base portion 247 may extend long along a side surface of the terminal and may be disposed at a portion of the frame portion 205 which is adjacent to the metal rim 206. That is, the base portion 247 can be formed parallel to the side surface of the terminal at one side of the frame portion 205.

One end of the base portion 247 can be connected to a main circuit board of the mobile terminal, and the main circuit board can operate as the aforementioned controller. In addition, the main circuit board can be a circuit board which is electrically connected to an antenna pattern and configured to process wireless signals (or radio electromagnetic waves) transmitted and received.

In this instance, the detecting unit for detecting a touch applied to the terminal body by using a signal change of the ultrasonic receiving sensor 245 by a touch applied on a path of ultrasonic waves can be the controller or a driving chip provided in the controller. As another example, an operation driver can be mounted on the flexible circuit board 246, and the operation driver may also be the detecting unit.

Referring to these drawings, the flexible circuit board 246 may include a plurality of mounting portions 248. Each of the mounting portions 248 may protrude from the base portion 247, so that any one of the ultrasonic output sensor 244 or the ultrasonic receiving sensor 245 is mounted thereon.

The ultrasonic output sensor 244 and the ultrasonic receiving sensor 245 are disposed inside the case 204 to sense a touch applied to outside of the case 204. In this way, the case 204 forms the side surface of the terminal body, and the ultrasonic sensing unit 243 senses a sliding input applied to the side surface of the terminal body. Therefore, a sensing region SR where a sliding input is sensed is formed on the side surface of the terminal body.

For example, the sensing region SR formed on the side end portion 208a, 208b can be formed on a long metal rim of an opposite side to a position where the battery of the mobile terminal is disposed. For example, when the battery is disposed adjacent to the right side end portion 208b, the sensing region SR can be formed on the opposite left side end portion 208a. Further, when the battery 191 is disposed adjacent to the left side end portion 208a, the sensing region SR can be formed on the opposite right side end portion 208b. Preferably, the sensing region SR is formed on the right side end portion 208b, as illustrated in the drawings. That is, the sensing region SR can be formed on the right side end portion 208b corresponding to a right long side of the metal rim 208 when viewed from the front side of the terminal body.

In this instance, the ultrasonic output sensor 244 and the ultrasonic receiving sensor 245 can be repeatedly disposed inside the case corresponding to the sensing region SR. For example, the ultrasonic sensing unit 243 can be provided with a plurality of ultrasonic output sensors 244 and a plurality of ultrasonic receiving sensors 245, which can be arranged in one direction in an alternating manner. A pair of ultrasonic output sensor 244 and ultrasonic receiving sensor 245 may form one sensing part SP. That is, the ultrasonic output sensor 244 and the ultrasonic receiving sensor 245 can be disposed in each of the plurality of sensing parts SP, and accordingly, the ultrasonic sensing unit 243 may include the plurality of sensing parts SP sequentially disposed along one direction. Accordingly, in this embodiment, the ultrasonic output sensor 244 and the ultrasonic receiving sensor 245 can be provided in the same number, and a total number of sensors can be an even number.

In this instance, one ultrasonic output sensor 244 or ultrasonic receiving sensor 245 can be mounted on one mounting portion 248. Therefore, the plurality of mounting portions 248 may also operate as a pair, and can be sequentially arranged along the one direction.

In the meantime, referring to FIGS. 5, 6, 7A and 7B, in this example, in addition to the basic structure of the ultrasonic sensing unit 143 described in FIG. 2, a mechanism for reducing a noise signal in the ultrasonic sensing unit 143 can be applied. As a cause of the noise signal, a waveform may be transmitted through the flexible circuit board 146 in addition to the case 204, and the noise signal may overlap an original signal, thereby bringing about a phase shift, and the like. In this example, the continuity of a physical medium between the ultrasonic output sensor 244 and the ultrasonic receiving sensor 245 is interrupted. As an example, an empty space for reducing noise transmitted through the flexible circuit board 246 can be formed between the mounting portions 248. To form such empty space, the mounting portions 248 can protrude toward the side surface of the terminal body at positions spaced apart from one another along the base portion 247.

More specifically, the base portion 247 can be disposed parallel to the side surface of the terminal body, and the mounting portions 248 can protrude in a direction perpendicular to the base portion 247. In this instance, the mounting portions 248 can be bent at at least one point. Accordingly, the ultrasonic output sensor 244 and the ultrasonic receiving sensor 245 can be arranged to face the side surface of the terminal. That is, the ultrasonic output sensor 244 and the ultrasonic receiving sensor 245 are disposed to be perpendicular to the base portion 247, and sense a touch input applied to the side surface of the terminal body.

Referring to those drawings, each of the mounting portions 248 may include a first portion 248a and a second portion 248b. The first portion 248a is a portion protruding from the base portion 247 and the plurality of first portions 248a can be sequentially disposed along one side of the base portion 247. The first portion 248a protrudes in a direction perpendicular to the base portion 247 and can be bent at at least one point.

The second portion 248b protrudes from the first portion 248a toward an adjacent mounting portion 248 and can be a portion where the ultrasonic output sensor 244 or the ultrasonic receiving sensor 245 is disposed. For example, the second portion 248b can be formed long in a direction perpendicular to the first portion 248a and thus have an area on which the ultrasonic output sensor 244 or the ultrasonic receiving sensor 245 is mounted.

In addition, the second portions 248b can be sequentially disposed along a direction parallel to the base portion 247, and thus can be sequentially disposed along the side surface of the terminal body. Accordingly, the plurality of sensing parts SP can be arranged in a line along the side surface of the terminal body. According to the arrangement, touch sensing sections corresponding to the respective sensing parts SP are connected in one direction. Further, since the flexible circuit board 246 is configured such that the base portion 247 extends along the one direction but the mounting portions 248 protrude individually from the base portion 247, empty spaces can be formed in a direction that the ultrasonic output sensor 244 and the ultrasonic receiving sensor 245 are arranged. Therefore, the noise signal is hardly transmitted through the flexible circuit board 246.

In addition, the sliding input is an input that continues along the side surface of the terminal body, and thus the ultrasonic sensing unit 243 can sense the sliding input applied to the side surface of the terminal body. Also, in this example, a plurality of grooves 208 can be formed on an inner side of the case 204, and the ultrasonic output sensor 244 and the ultrasonic receiving sensor 245 can be provided as a pair in each of the plurality of grooves 208. According to this structure, the plurality of grooves 208 can be sequentially arranged along the side surface of the terminal body and thus barrier ribs can be formed between adjacent grooves 208 of the plurality of grooves 208, so that an ultrasonic wave, which is transmitted and received from one of the plurality of grooves 208, can be restricted from being introduced into another.

More specifically, a recessed region can be formed in the metal rim 206 such that the ultrasonic output sensor 244 and the ultrasonic receiving sensor 245 are disposed therein. The recessed region can be the groove 208 and the groove 208 can be formed at a position which is not exposed to the outside of the metal rim 206. Also, the plurality of grooves 208 can be arranged in a line on an inner surface of the metal rim 206. A bottom of each groove 208 can be formed parallel to the metal rim 206 and the ultrasonic output sensor 244 and the ultrasonic receiving sensor 245 can be attached to the bottom. The attachment can be made by an adhesive member 221. Thus, the adhesive members 221 can be disposed between the bottom of the groove 208 and upper surfaces of the ultrasonic output sensor 244 and the ultrasonic receiving sensor 245.

Thus, as the pair of the ultrasonic output sensor 244 and the ultrasonic receiving sensor 245 that transmit and receive ultrasonic signals is accommodated in each of the grooves 208, the ultrasonic output sensor 244 and the ultrasonic receiving sensor 245 can be accommodated together in one groove 208. According to this structure, as the barrier ribs are disposed between the adjacent sensing parts SP, the introduction of an ultrasonic signal of one sensing part SP into another sensing part SP can be reduced.

However, the present invention is not limited thereto, and each of the ultrasonic output sensor 244 and the ultrasonic receiving sensor 245 can be accommodated in any one of the plurality of grooves 208. The sensors are attached on a bottom of each groove 208, and a barrier rib can be disposed between the ultrasonic output sensor 244 and the ultrasonic receiving sensor 245. According to such a structure, other signals, except for ultrasonic waves, transmitted along the surface of the metal rim 206 can be prevented from being introduced into the ultrasonic receiving sensor 245.

Thus, this embodiment has employed the ultrasonic sensing unit 243 to implement a sensing region of a sliding input in a metal rim when the case 204 forming the side surface of the terminal 200 is made of a metal. In addition, a novel structure for enhancing performance of the ultrasonic sensing unit 243 is provided, which can also be applicable to a case made of a different material, other than the metal rim.

The structure of the mobile terminal having the ultrasonic sensing unit described above can be modified into various forms. In the variations or embodiments to be described, the same or similar reference numerals are given to the same or similar components as those of the foregoing embodiment and the description is replaced with the first explanation.

As an example, the ultrasound sensing unit described above can vary an absorption amount of ultrasound waves when a separate case is attached to the terminal body of the mobile terminal or when the ultrasound sensing unit is in water, and modifications or variations to solve this problem can be presented. Hereinafter, these modifications will be described with reference to FIGS. 8 to 11.

Figure 8:
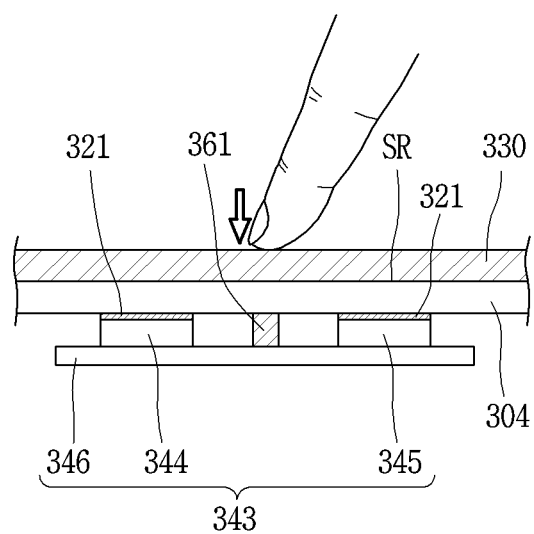
FIG. 8 is a conceptual view illustrating another embodiment of a mobile terminal according to an embodiment of the present invention.
Figure 9:
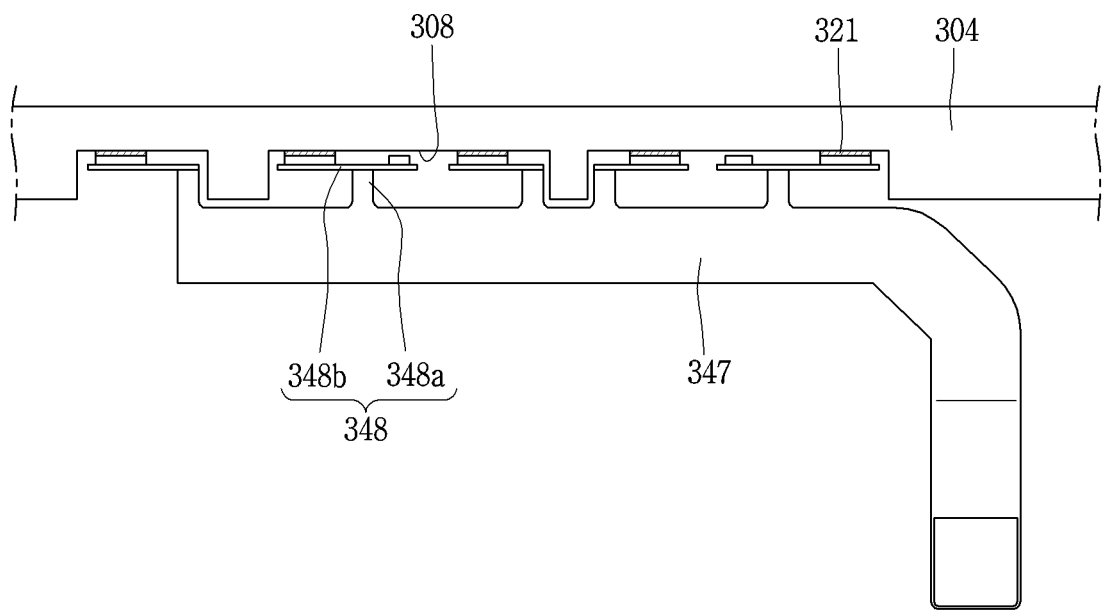
FIG. 9 is a partially enlarged view illustrating a configuration that the example of FIG. 8 is applied to the part A of FIG. 4.
Figure 10:
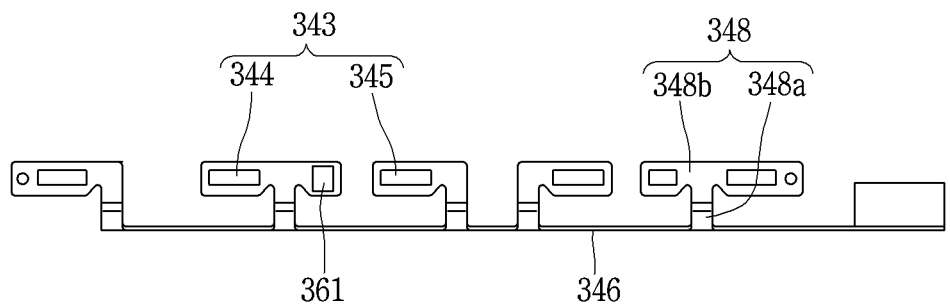
FIG. 10 is an enlarged view of an ultrasonic sensing unit of FIG. 9.
Figure 11:
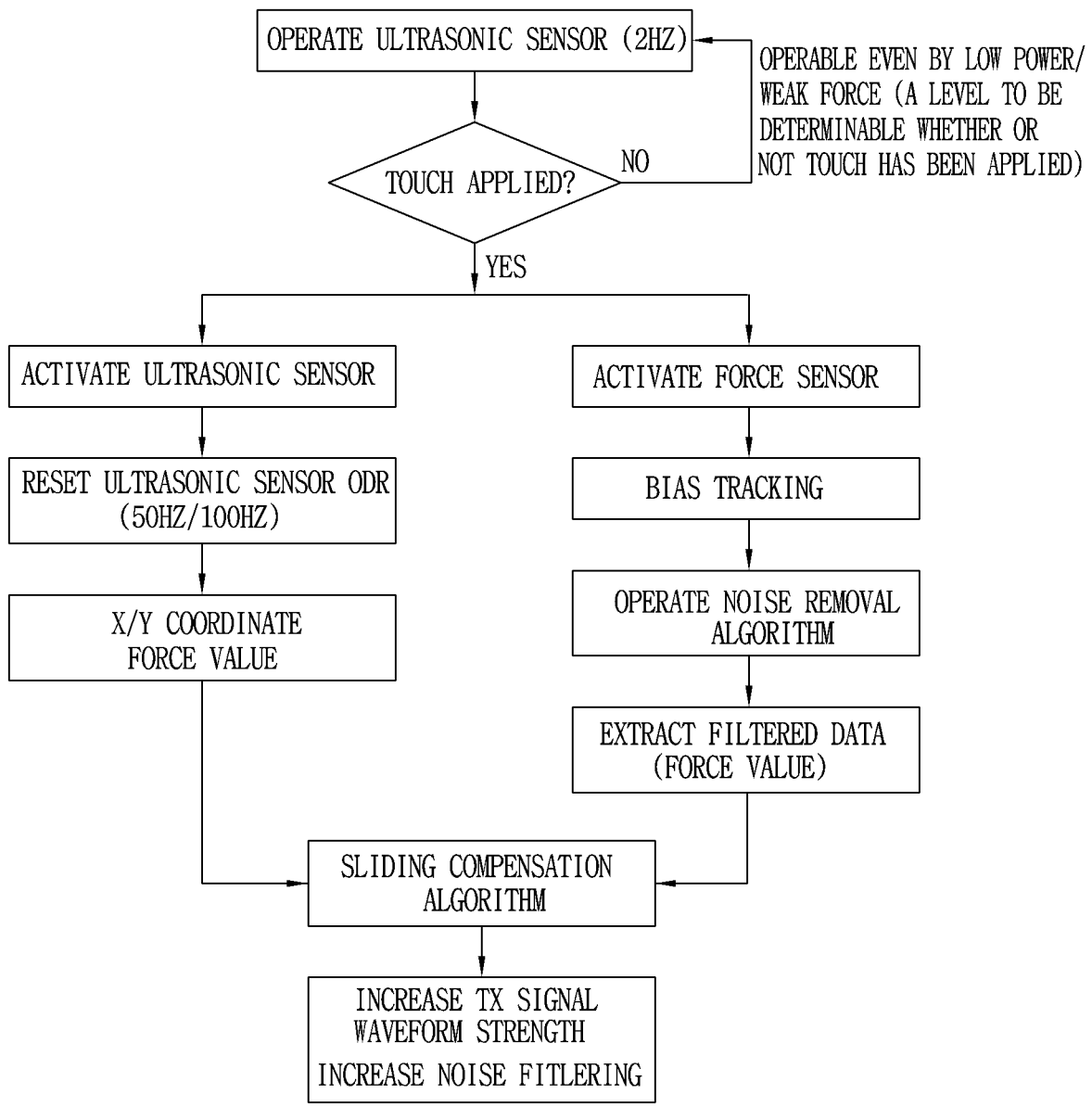
FIG. 11 is a flowchart illustrating a control operation of an ultrasonic sensing unit of FIG. 9.

FIG. 8 is a conceptual view illustrating another embodiment of a mobile terminal according to an embodiment of the present invention, FIG. 9 is a partially enlarged view illustrating a configuration that the example of FIG. 8 is applied to the part A of FIG. 4, FIG. 10 is an enlarged view of an ultrasonic sensing unit 343 of FIG. 9, and FIG. 11 is a flowchart illustrating a control operation of the ultrasonic sensing unit 343 of FIG. 9.

Referring to FIG. 8, a terminal body of a mobile terminal according to this embodiment can be housed in a separate cover 330. The cover 330 serves as a protective cover for covering the mobile terminal and is formed so as to accommodate a rear surface of the terminal body of the mobile terminal.

An ultrasonic sensing unit 343 can be disposed inside a case 304 forming at least part of appearance and at least part of the case 304 can be disposed to be veiled by the cover 330.

Similar to the foregoing embodiment, the case 304 can be formed by injection-molding synthetic resin or can be formed of a metal, for example, stainless steel (STS), aluminum (Al), titanium (Ti), or the like.

The terminal body has the ultrasonic sensing unit 343 mounted thereon to face an inner surface of the case 304, and a sensing region SR is formed on an outer surface of the case 304. In this instance, the cover 330 can be arranged to cover the sensing region SR. More specifically, the cover 330, the case 304, and the ultrasonic sensing unit 343 can be stacked in sequence.

Similar to the foregoing embodiment, the ultrasonic sensing unit 343 may include an ultrasonic output sensor 344, an ultrasonic receiving sensor 345 and a circuit board 346. The ultrasonic receiving sensor 345 can be spaced apart from the ultrasonic output sensor 344 so as to receive ultrasonic waves output from the ultrasonic output sensor 344.

Further, the ultrasonic output sensor 344 and the ultrasonic receiving sensor 345 can be located to be in contact with the inner surface of the case 304, respectively. For the contact, an upper surface of the ultrasonic output sensor 344 and an upper surface of the ultrasonic receiving sensor 345 can be adhered to the inner surface of the case 304 by an adhesive member 321.

The surface acoustic waves can propagate along the case 304 as the ultrasonic output sensor 344 capable of vibrating ultrasonic waves is disposed on the inner surface of the case 304. When a finger or another object touches a surface of the case 304, ultrasonic waves are absorbed or reduced, and a touch position can be detected by a signal change of the ultrasonic receiving sensor 345.

The ultrasonic output sensor 344 and the ultrasonic receiving sensor 345 can be arranged in one direction so that the ultrasonic sensing unit 343 can sense a sliding touch. Accordingly, the ultrasonic sensing unit detects that a finger or another object is slid on the surface of the case 304, and the detecting unit processes the sliding as a preset control command.

However, in this instance, a different force level of waveform can be received when the same force is applied depending on presence or absence of the cover 330. Such different force level of waveform may also be received even when the same force is applied depending on a material and thickness of the cover 330. In addition, since a certain amount of ultrasonic waves is basically absorbed by the cover 330, there is a problem that a difference in absorption of ultrasonic waves before and after a touch is applied by a finger becomes smaller than that in case where the cover 330 is not provided.

In order to solve this problem, in this embodiment, a sensing sensitivity of the ultrasonic sensing unit 343 is compensated when a waveform of a signal received by the ultrasonic receiving sensor 345 satisfies a signal attenuation condition. The signal attenuation condition may correspond to when a signal waveform is attenuated to a specific level of waveform amplitude due to presence of the cover 330, when a signal waveform is attenuated to a specific level of waveform amplitude due to being under water, or the like.

More specifically, the mobile terminal of this embodiment further includes a force sensor 361 disposed adjacent to the ultrasonic output sensor 344 or the ultrasonic receiving sensor 345. In this instance, a signal change of the ultrasonic receiving sensor 345 is compensated using touch sensing by the force sensor 361.

For example, referring to FIG. 11, a control of the ultrasonic sensing unit 343 and the force sensor 361 can be performed as described below. First, the ultrasonic sensing unit 343 operates to determine whether a touch has been applied. The ultrasonic sensing unit 343 can operate at a level that it can determine whether a touch has occurred even by low power or a weak force. As an example, the ultrasonic sensing unit 343 can operate at a low frequency in an idle mode in which a display of the mobile terminal is deactivated, a lock mode in which a screen of the mobile terminal is locked, or before an initial touch is applied to the sensing region although the display is activated.

When the touch is sensed, the ultrasonic sensing unit 343 and the force sensor 361 can be activated. In the activated ultrasonic sensing unit 343, an operation condition of the ultrasonic output sensor 344 is reset, and thus the ultrasonic sensing unit 343 operates at a higher frequency. Sliding from the touch can be detected as the ultrasonic sensing unit 343 senses a coordinate value and strength of a force. In this instance, the activated force sensor 361 performs bias tracking and activates a noise reduction algorithm. When the force sensor 361 extracts filtered data with respect to the strength of the force, the sliding input sensed by the ultrasonic sensing unit 343 can be compensated based on a compensation algorithm. This results in increasing strength of an output signal waveform and enhancing noise filtering.

Further, referring to FIGS. 9 and 10, in the mobile terminal according to this embodiment, the force sensor 361 can be disposed between the ultrasonic output sensor 344 and the ultrasonic receiving sensor 345 on a flexible circuit board 346 on which the ultrasonic output sensor 344 or the ultrasonic receiving sensor 345 is mounted.

For example, similar to the foregoing embodiment, the flexible circuit board 346 has a base portion 347 disposed on a plane of a frame portion. Unlike the foregoing embodiment, mounting portions 348 protruding from the base portion 347 can be configured so that the force sensor 361 as well as the ultrasonic output sensor 344 or the ultrasonic receiving sensor 345 can be mounted.

The ultrasonic output sensor 344 and the ultrasonic receiving sensor 345 are disposed inside the case 304 to sense a touch applied to outside of the case 304. In this way, the case 304 forms the side surface of the terminal body, and the ultrasonic sensing unit 343 senses a sliding input applied to the side surface of the terminal body. Therefore, a sensing region for sensing a sliding input is formed on the side surface of the terminal body, and the force sensor 361 is disposed within the sensing region.

More specifically, the base portion 347 can be disposed parallel to the side surface of the terminal body, and the mounting portions 348 can protrude in a direction perpendicular to the base portion 347. Each of the mounting portions 348 may include a first portion 348a and a second portion 348b.

The first portion 348a is a portion protruding from the base portion 347 and the plurality of first portions 248a can be sequentially disposed along one side of the base portion 347. The first portion 348a protrudes in a direction perpendicular to the base portion 347 and can be bent at at least one point.

The second portion 348b protrudes from the first portion 348a toward an adjacent mounting portion 348 and can be a portion where at least one of the ultrasonic output sensor 344, the ultrasonic receiving sensor 361 and the force sensor 361 is disposed. For example, the second portion 348b can be formed long in a direction perpendicular to the first portion 348a and thus sequentially arranged along a direction parallel to the base portion 347. Each of the mounting portions 348 may include a sensor mounting portion for mounting one of the ultrasonic output sensor 344 and the ultrasonic receiving sensor 345, and a force mounting portion for mounting the force sensor 361 together with the ultrasonic output sensor 344 or the ultrasonic receiving sensor 345.

Similar to the foregoing embodiment, the second portion 348b in the sensor mounting portion may protrude from the first portion 348a to one side, but the second portion 348b in the force mounting portion may protrude from the first portion 348a to both sides. With this structure, the force sensor 361 can be disposed together with the ultrasonic sensor 344, 345 in the force mounting portion. According to this structure, a plurality of sensing parts can be arranged in a line along the side surface of the terminal body, and the separate force sensor 361 can be provided in each of the sensing parts. Even in this instance, since the mounting portions 348 protrude from the base portion 347 individually, empty spaces can be formed in a direction that the ultrasonic output sensors 344 and the ultrasonic receiving sensors 345 are arranged. Therefore, the noise signal is hardly transmitted through the flexible circuit board 346.

Figure 12:
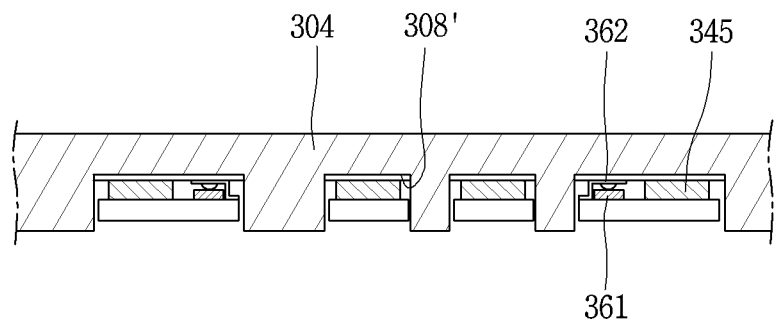
FIGS. 12 and 13 are a sectional view and an enlarged view illustrating a modification of an ultrasonic sensing unit of FIG. 9.
Figure 13:
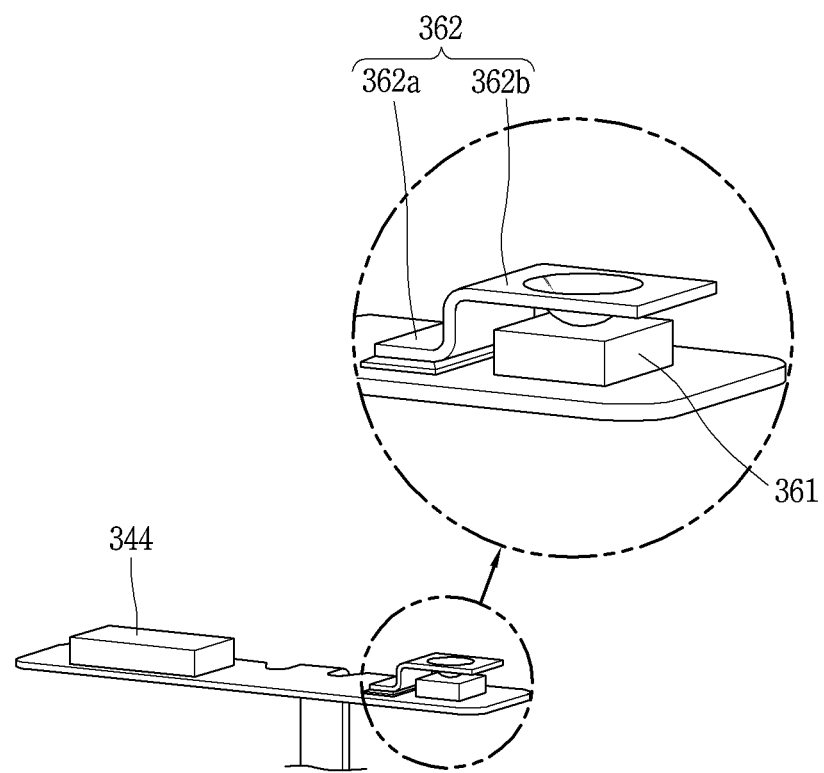

Further, referring to FIGS. 12 and 13, the ultrasonic sensing unit 343, which operates together with the force sensor 361, can be modified into various forms. In particular, FIGS. 12 and 13 are a sectional view and an enlarged view illustrating a modification of an ultrasonic sensing unit of FIG. 9.

As illustrated in those drawings, the ultrasonic output sensor 344 or the ultrasonic receiving sensor 345 can be mounted on the flexible circuit board 346 and an actuator 362 covering the force sensor 361 can be disposed on the flexible circuit board 346. In the exemplary structure described with reference to FIGS. 8 to 11, the force sensor 361 and the ultrasonic sensors 344, 345 may have different heights from each other, and this problem is solved using the actuator 362 in this embodiment.

More specifically, a plurality of grooves 308' can be formed inside the case 304, and the force sensor 361 can be provided in one of the plurality of grooves 308' together with at least one of the ultrasonic output sensor 344 and the ultrasonic receiving sensor 345. Each of the ultrasonic output sensor 344 and the ultrasonic receiving sensor 345 can be attached to a bottom of one groove 308'. However, the present invention is not limited thereto, and a pair of the ultrasonic output sensor and the ultrasonic receiving sensor can be accommodated in one groove, similar to the foregoing embodiment.

As illustrated, an upper surface of the ultrasonic output sensor 344 and an upper surface of the ultrasonic receiving sensor 345 are brought into contact with an inner side of the case 304. Further, the force sensor 361 may lower than the ultrasonic output sensor 344 and the ultrasonic receiving sensor 345 in height, and thus a gap can be generated between the force sensor 361 and the bottom of the groove 308'. The actuator 362 is provided to cover an upper surface of the force sensor 361, in order to fill the gap.

For example, the actuator 362 may include a connecting portion 362a connected to the flexible circuit board 346 and an extending portion 362b extending from the connecting portion 362a to cover the upper surface of the force sensor 361. The actuator 362 can be bent at at least two points so that the extending portion 362b covers the upper surface of the force sensor 361. In this instance, the extending portion 362b is brought into contact with the bottom of the groove 308' to transmit a force applied to the sensing region to the force sensor 361.

In addition, the present invention can be applied to embodiments in which a button area for sensing a short touch or tap touch is provided on a side surface of a mobile terminal, in addition to the aforementioned sensing region. Hereinafter, these embodiments will be described in more detail with reference to FIGS. 14 to 18.

Figure 14:
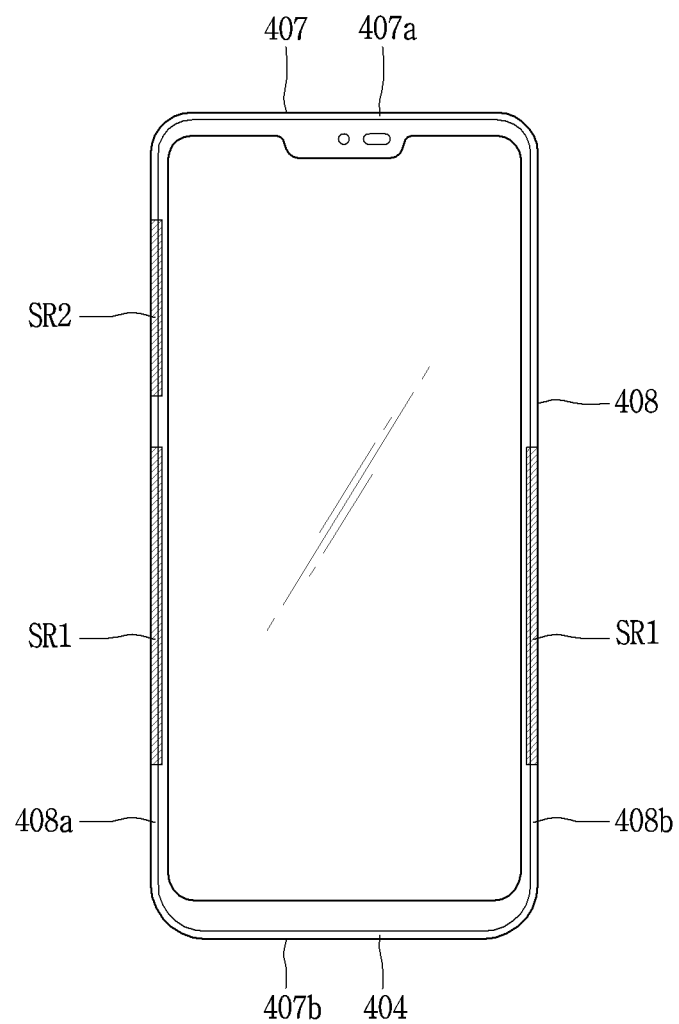
FIG. 14 is a conceptual view illustrating another embodiment of a mobile terminal according to an embodiment of the present invention.
Figure 15:
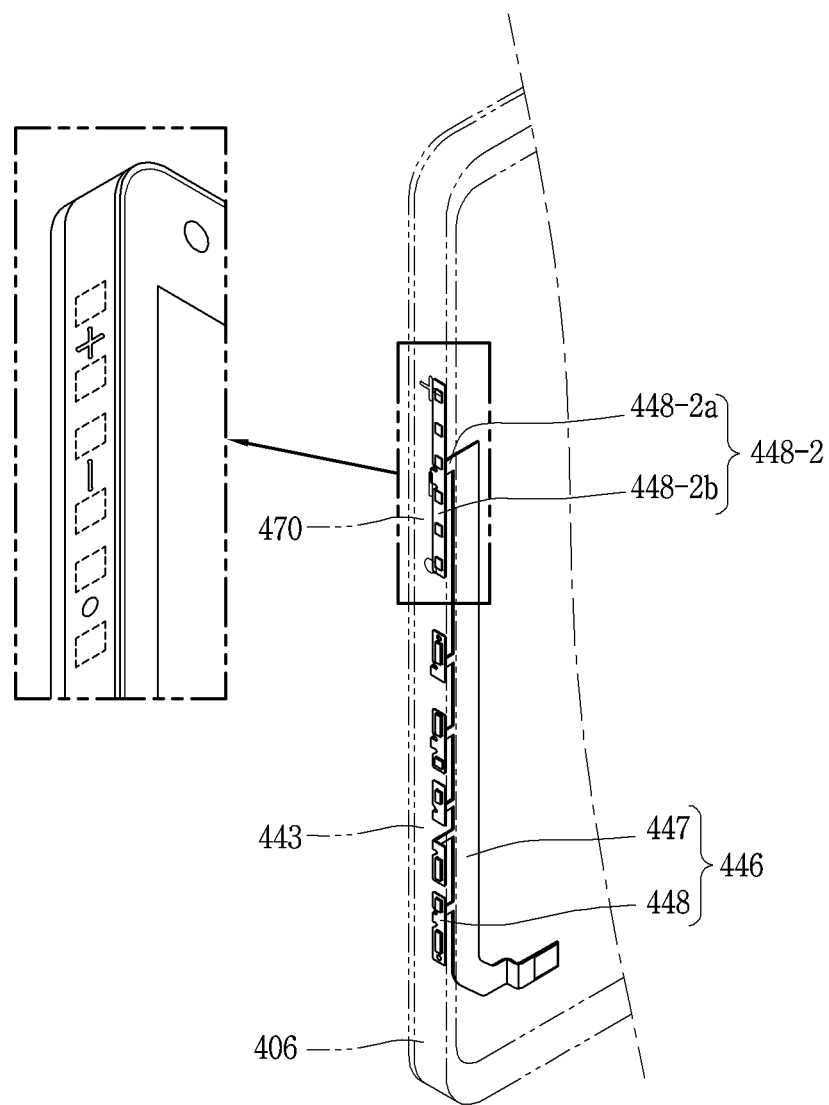
FIGS. 15 and 16 are an exploded view and a sectional view of the mobile terminal of FIG. 14.
Figure 16:
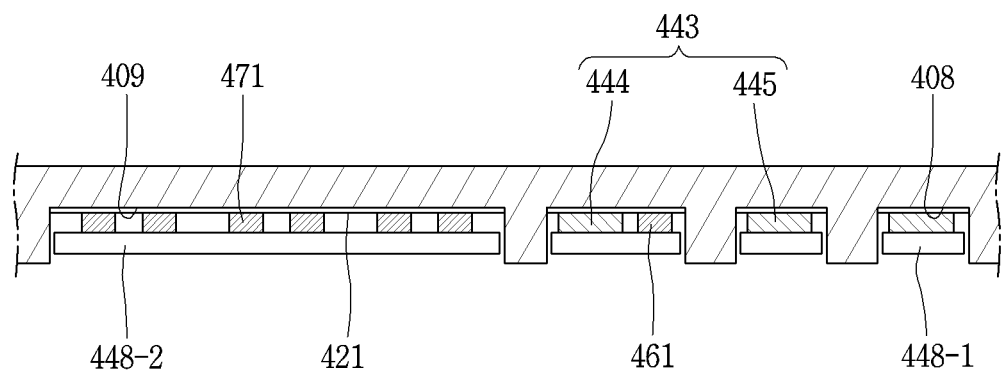

FIG. 14 is a conceptual view illustrating another embodiment of a mobile terminal according to an embodiment of the present invention, and FIGS. 15 and 16 are an exploded view and a sectional view of the mobile terminal of FIG. 14.

Referring to FIG. 14, a side surface of a mobile terminal can be provided with a first sensing region SR1 where a sliding input is sensed, and a second sensing region SR2 where a force input is sensed. The first and second sensing regions SR1 and SR2 can be formed in a line. In this instance, the first sensing region SR1 can be formed on each of right and left sides of a terminal body.

As a more specific example, a metal rim 406 of a case 404 may include a first metal rim 407 disposed on an upper or lower end of the mobile terminal, and a second metal rim 408 disposed on side surfaces of the mobile terminal. Further, the first metal rim 407 may include an upper end portion 407a located at the upper end of the mobile terminal, and a lower end portion 407b located at the lower end of the mobile terminal, and the second metal rim 408 may include side end portions 408a and 408b located at both side surfaces of the mobile terminal.

The upper end portion 407a and the lower end portion 407b extend in one direction between the side surfaces of the mobile terminal to form upper or lower appearance of the mobile terminal. The side end portions 408a and 408b are disposed in a pair between the upper end portion and the lower end portion to form appearance of the side surfaces of the mobile terminal. As illustrated, this embodiment illustrates that the upper end portion 407a and the lower end portion 407b of the metal rim are shorter than the side end portions 408a and 408b.

Referring to those drawings, the first sensing regions SR1 can be portions where ultrasonic sensing units 443 are disposed on both the side end portions 408a and 408b of the mobile terminal. Since the ultrasonic sensing unit 443 is disposed on each of the both sides of the mobile terminal, the ultrasonic sensing units 443 may sense a squeeze input as well as a sliding input. For example, the ultrasonic sensing unit 443 can be disposed on each of both sides of the terminal body so that a grip state and a squeeze state can be distinguished according to strength of applied pressure. That is, when pressure equal to or greater than a preset value is applied to a touch input, the ultrasonic sensing unit 143 may identify it as a squeeze state and performs a control operation according to this.

In addition, a force sensing unit 470 is disposed in the second sensing region SR2 to sense a short touch or a tap touch applied to a button. The second sensing region SR2 can be arranged in a line with one of the first sensing regions SR1, for example, a left first sending region SR1. Button marks of volume-up, volume-down and the like can be provided on the second sensing region SR2, so as to serve as side buttons of the mobile terminal.

Referring to FIGS. 15 and 16, the force sensing unit 470 may include a plurality of force sensors 471 sequentially disposed along one direction in the second sensing region SR2. The plurality of force sensors 471 can be an MEMS type force sensor 471. In this instance, the force sensing unit 470 and the ultrasound sensing unit 443 may share a single flexible circuit board 446. For example, the flexible circuit board 446 may include a base portion 447 disposed on a plane of a frame portion of the case 404, and a plurality of mounting portions 448 protruding from the base portion 447.

Referring to those drawings, the mounting portions 448 may include first mounting portions 448-1 for mounting sensors (an ultrasonic output sensor 444, an ultrasonic receiving sensor 445, and a force sensor 461) of the ultrasonic sensing unit 443, and a second mounting portion 448-2 for mounting sensors (MEMS type force sensors) 471 of the force sensing unit. The first and second mounting portions 448-1 and 448-2 may protrude from the base portion 447, respectively.

The first mounting portions 448-1 may have the same structure as any one of the mounting portions of the ultrasonic sensing unit 343 described with reference to FIGS. 8, 9, 10, 11, 12, and 13, and thus a description thereof is omitted.

The second mounting portion 448-2 may include a first portion 448-2a protruding from the base portion 447, and a second portion 448-2b extending from the first portion in parallel to the base portion. In this instance, the force sensors 471 can be sequentially disposed in the second portion 448-2b. For example, the second portion 448-2b can be formed long to have a length corresponding to an entire length of the second sensing region SR2 in a direction perpendicular to the first portion 448-2a. Therefore, the force sensors 471 provided in the force sensing unit can be arranged on a single mounting portion.

Further, a plurality of grooves 408 can be formed on an inner side of the case 404, and the ultrasonic output sensor 444 and the ultrasonic receiving sensor 445 can be accommodated in any one of the plurality of grooves 408. The groove in which the ultrasonic sensing unit 443 is accommodated may have the same structure as that illustrated in the foregoing embodiment, and thus a description thereof is omitted.

In this example, an accommodating groove 409 for accommodating the mounting portion 448-2 corresponding to the force sensing unit can be formed adjacent to the plurality of grooves. More specifically, a recessed region can be formed in the metal rim so that the force sensors 471 can be arranged therein. The recessed region can be the accommodating groove 409 and the accommodating groove 409 can be formed at a position which is not exposed to outside at the metal rim 206. An upper surface of each force sensor 471 can be attached to a bottom of the accommodating groove 409 and an adhesive member 421 can be disposed between the accommodating groove 409 and the force sensor 471.

In addition, the sensor provided in the force sensing unit according to this embodiment can be modified into various forms. In particular, FIGS. 17A, 17B, and 18 are sectional views illustrating different embodiments of a force sensing unit of FIG. 15.

Figure 17A:
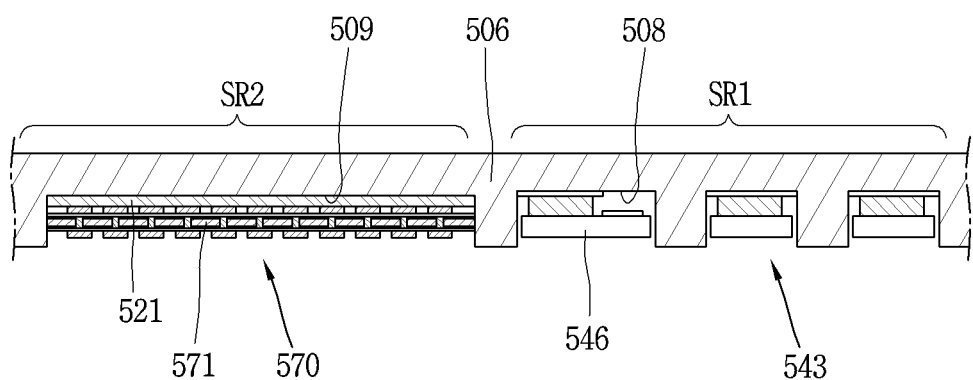
FIGS. 17A, 17B, and 18 are sectional views illustrating different embodiments of a force sensing unit of FIG. 15.
Figure 17B:
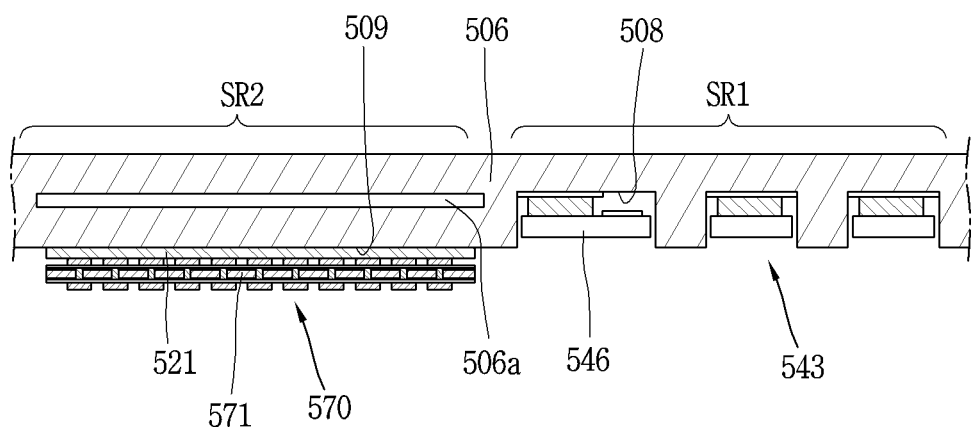
Figure 18:
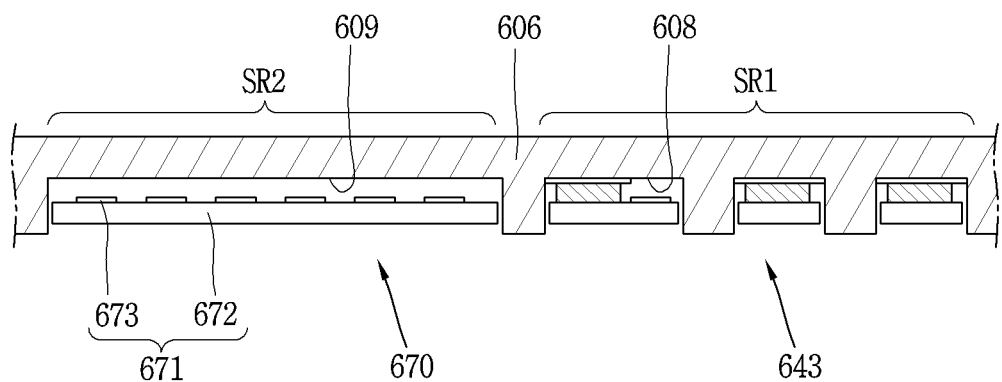

Referring to FIG. 17A, a force sensing unit 570 may include a strain gauge force sensor 571. In this instance, an MEMS type force sensor mounted on a flexible circuit board 546 in the foregoing embodiment can be replaced with the strain gauge force sensor 571.

In this example, only sensors of an ultrasonic sensing unit 543 can be attached to a flexible circuit board 546, and the force sensing unit 570 may have a separate flexible circuit board. In this embodiment, a metal rim 506 can be provided with a plurality of grooves 508 for accommodating sensors of the ultrasonic sensing unit 543, and an accommodating groove 509 formed adjacent to the plurality of grooves 508 to accommodate the strain gauge force 571. In this instance, an upper surface of the strain gauge force sensor 571 can be attached to a bottom of the accommodating groove 509 by an adhesive member 521.

As another example, when a strain gauge force sensor is provided, a structure without an accommodating groove is also possible. Referring to FIG. 17B, the plurality of grooves 508 can be formed on an inner surface of the metal rim to accommodate the sensors of the ultrasonic sensing unit 543, and the strain gauge force sensor 571 can be attached on an inner surface of the metal rim 506.

In this instance, the first sensing regions SR1 and the second sensing region SR2 can be disposed outside a case forming at least part of the side surface of the terminal body, and a slot 506a can be formed inside the case 504 so that the second sensing region SR2 is curved by a force input. More specifically, the slot 506a can be formed parallel to the strain gauge force sensor 571 between an outer surface of the metal rim 506 and the inner surface of the metal rim to which the strain gauge force sensor 571 is attached. According to this structure, a strain gauge force sensor can be applied to a button region even in the case of employing a metal case.

As another example, referring to FIG. 18, a force sensing unit 670 may include an inductive type force sensor 671. In this instance, the MEMS type force sensor or the strain gauge force sensor illustrated in the foregoing embodiments can be replaced with the inductive type force sensor 671. An ultrasonic sensing unit 643 is disposed in a first sensing region SR1.

The inductive type force sensor 671 can be a sensor which senses a pressing force using a principle that a magnetic field is generated when an alternating current is supplied to a coil, and a principle that an eddy current is generated when a coil approaches a conductive material. That is, the inductive type force sensor 671 senses an eddy current generated when a coil approaches a metal rim 606 and determines a pressing degree.

In order to implement the sensing mechanism, the inductive type force sensor 671 can be accommodated in an accommodating groove 609 and a coil pattern 673 can be arranged with being spaced apart from a bottom of the accommodating groove 609. For example, the inductive type force sensor 609 may include a coil pattern 673 formed on one surface of a flexible circuit board 672. The flexible circuit board 672 can be accommodated in the accommodating groove 609 but a space can be formed between the bottom of the accommodating groove 609 and the coil pattern 673.

Meanwhile, FIGS. 3 to 18 have illustrated that an ultrasonic sensing unit is disposed inside the metal rim, but an ultrasonic sensing unit of the present invention can alternatively be disposed outside a metal rim. Hereinafter, these embodiments will be described in more detail with reference to FIG. 19.

Figure 19:
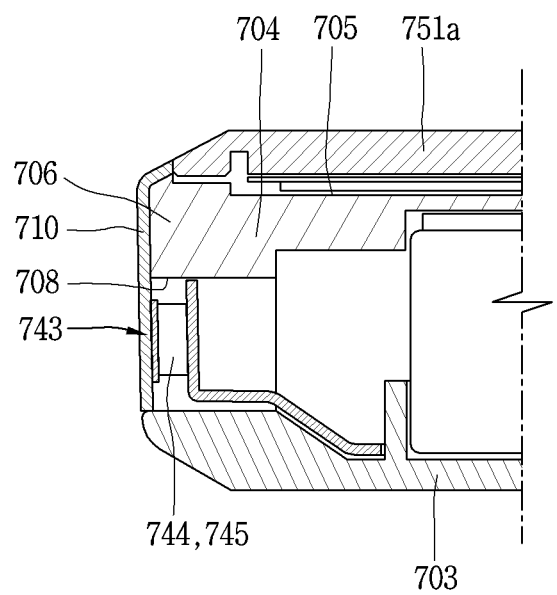
FIG. 19 is a conceptual view illustrating another embodiment of a mobile terminal according to an embodiment of the present invention.

FIG. 19 is a conceptual view illustrating another embodiment of a mobile terminal according to an embodiment of the present invention. As illustrated, when a cover glass 751a and a rear cover 703 are disposed on a front surface and a rear surface of a case 704, a part of a side surface of the case 704 can be exposed to outside. As described above, the case 704 is made of a metallic material and thus has sufficient rigidity even if it is formed to have a slim thickness. Therefore, the case 704 can be a frame.

Further, the case 704 may have a metal rim 706 forming side surfaces of the mobile terminal so as to connect a front surface and a rear surface of the mobile terminal. The metal rim 706 can be made of a metallic material.

More specifically, the case 704 has a frame portion 705 facing the cover glass 751a, and the metal rim 706 can be formed along edges of the frame portion 705.

The frame portion 705 can be a part parallel to the front and rear surfaces of the mobile terminal and may have a front side facing the front surface and a rear side facing the rear surface. The metal rim 704 can be disposed in a direction perpendicular to the frame portion 705 to support the cover glass 751a at the front side and the rear cover 703 at the rear side. Here, supporting may refer to not only contacting but also even engaging with each other.

In this instance, a plurality of through holes 708 can be formed through the metal rim 706, and an ultrasonic output sensor 744 and an ultrasonic receiving sensor 745 can be provided as a pair in one of the plurality of through holes 708. A metal member 710 for covering the through holes 709 can be coupled to the metal rim 706. More specifically, the ultrasonic output sensors 744 and the ultrasonic receiving sensors 745 accommodated in the plurality of through holes 709 can be attached to an inner surface of the metal member. An outer surface of the metal member 710 can be the above-described sensing region. Accordingly, barrier ribs can be formed between adjacent through holes of the plurality of through holes 709 so as to restrict ultrasonic waves transmitted or received from one of the plurality of through holes 709 from being introduced into other paths except for the metal member 710.

This embodiment can be the same as the foregoing embodiments, except for the structure that the through holes 709 are formed through the metal rim 706 and the separate metal member 710 is provided. Also, according to the structure in which the sensors (ultrasonic output sensor, ultrasonic receiving sensor, force sensor, etc.) of the ultrasonic sensing unit 743 are accommodated in the through holes of the metal rim as illustrated in this embodiment, the metal member can be made thinner in thickness in the sensing region.

The aforementioned mobile terminal having the ultrasonic sensing unit are not limited to the configurations and the methods of the embodiments described above, but all or some of the embodiments can be selectively combined so that various modifications can be made.

What is claimed is:

1. A mobile terminal, comprising:
a terminal body;
an ultrasonic sensing unit mounted on at least one side surface of the terminal body and configured to generate an ultrasonic wave on a path propagating along the at least one side surface of the terminal body; and
a detecting circuit configured to detect a touch applied to the terminal body by using a signal change caused due to a touch on the path of the ultrasonic wave,
wherein the ultrasonic sensing unit comprises:
an ultrasonic output sensor configured to output the ultrasonic wave;
an ultrasonic receiving sensor spaced apart from the ultrasonic output sensor along the path propagating along the side surface and configured to receive the ultrasonic wave output from the ultrasonic output sensor; and
a force sensor disposed adjacent to the ultrasonic output sensor or the ultrasonic receiving sensor,
wherein a signal change of the ultrasonic receiving sensor is compensated using touch sensing by the force sensor, and
wherein the force sensor extracts filtered data with respect to a strength of a force of the touch on the path of the ultrasonic wave, and the sliding input sensed by the ultrasonic sensing unit is compensated based on a compensation algorithm.

2. The mobile terminal of claim 1, wherein the ultrasonic sensing unit further comprises a plurality of sensing parts sequentially disposed along one direction on the side surface of the terminal body, and
wherein a corresponding ultrasonic output sensor and ultrasonic receiving sensor are disposed in each of the plurality of sensing parts.

3. The mobile terminal of claim 2, wherein the plurality of sensing parts are arranged in a line along the side surface of the terminal body so that the ultrasonic sensing unit senses a sliding input applied to the side surface of the terminal body.

4. The mobile terminal of claim 1, wherein the ultrasonic sensing unit further comprises a flexible circuit board on which the ultrasonic output sensor and the ultrasonic receiving sensor are mounted.

5. The mobile terminal of claim 4, wherein the flexible circuit board comprises:
a base portion; and
a plurality of mounting portions each protruding from the base portion, and wherein the ultrasonic output sensor is mounted on a first mounting portion and the ultrasonic receiving sensor is mounted on a second mounting portion spaced apart from the first mounting portion.

6. The mobile terminal of claim 5, wherein an empty space is formed between the mounting portions for reducing noise transmitted through the flexible circuit board, and
wherein the mounting portions protrude toward the side surface of the terminal body at positions spaced apart from each other along the base portion, so as to form the empty space.

7. The mobile terminal of claim 6, wherein the base portion is disposed in parallel with the side surface of the terminal body, and
wherein the mounting portions protrude in a direction perpendicular to the base portion.

8. The mobile terminal of claim 7, wherein each of the mounting portions comprises:
a first portion protruding from the base portion; and
a second portion protruding from the first portion toward an adjacent mounting portion, and
wherein one of the ultrasonic output sensor or the ultrasonic receiving sensor is disposed on the second portion.

9. The mobile terminal of claim 5, wherein each of the mounting portions is bent at at least one point, so that the ultrasonic output sensor and the ultrasonic receiving sensor are arranged to face a direction perpendicular to the base portion.

10. The mobile terminal of claim 1, further comprising:
a case forming at least part of appearance of the terminal body,
wherein the ultrasonic sensing unit is disposed inside the case to sense a touch applied to an outside of the case.

11. The mobile terminal of claim 10, wherein the case forms the side surface of the terminal body, and
wherein the ultrasonic sensing unit senses a sliding input applied to the side surface of the terminal body.

12. The mobile terminal of claim 11, wherein the side surface of the terminal body has a sensing region where the sliding input is sensed, and
wherein the ultrasonic output sensor and the ultrasonic receiving sensor are repeatedly disposed inside the case corresponding to the sensing region.

13. The mobile terminal of claim 10, wherein the case includes a plurality of grooves, and
wherein the ultrasonic output sensor and the ultrasonic receiving sensor are accommodated as a pair in at least one of the plurality of grooves.

14. The mobile terminal of claim 13, wherein the plurality of grooves are sequentially disposed along the side surface of the terminal body to form barrier ribs therebetween, so that the ultrasonic wave transmitted or received from one of the plurality of grooves is restricted from being introduced into another.

15. The mobile terminal of claim 1, wherein the ultrasonic sensing unit has a sensing sensitivity compensated when a waveform of a signal received by the ultrasonic receiving sensor satisfies a signal attenuation condition.

16. The mobile terminal of claim 15, wherein at least one the ultrasonic output sensor or the ultrasonic receiving sensor is mounted on a flexible circuit board, and
wherein the flexible circuit board includes an actuator disposed thereon to cover the force sensor.

17. The mobile terminal of claim 1, wherein the side surface of the terminal body has a first sensing region where a sliding input is sensed, and a second sensing region where a force input is sensed, the first sensing region and the second sensing regions being formed in a line, and
wherein the ultrasonic sensing unit is disposed in the first sensing region and a force sensing unit is disposed in the second sensing region.

18. The mobile terminal of claim 17, wherein the first sensing region and the second sensing region are disposed outside a case forming at least part of the side surface of the terminal body, and
wherein the case includes a slot formed so that the second sensing region is curved by the force input.

* * * * *